United States Patent

[11] 3,617,415

| [72] | Inventor | Manfred Hawerkamp<br>Altenrather Str. 47, Troisdorf, Germany |
|---|---|---|
| [21] | Appl. No. | 818,521 |
| [22] | Filed | Apr. 23, 1969 |
| [45] | Patented | Nov. 2, 1971<br>Continuation-in-part of application Ser. No. 516,945, Dec. 28, 1965, now abandoned. |

[54] METHOD OF MAKING HOLLOW REINFORCED BODIES
8 Claims, 13 Drawing Figs.

[52] U.S. Cl. .................................................. 156/172,
138/113, 156/171, 156/187, 156/192, 156/244
[51] Int. Cl. .................................................. B31c 13/00
[50] Field of Search .......................................... 156/171,
172, 173, 187, 244, 191, 192; 138/113, 114

[56] References Cited
UNITED STATES PATENTS

| 2,516,864 | 8/1950 | Gilmore et al. ............ | 156/143 |
|---|---|---|---|
| 2,890,264 | 6/1959 | Duff .......................... | 156/143 X |
| 3,325,327 | 6/1967 | Swan ........................... | 156/143 |

*Primary Examiner*—Benjamin R. Padgett
*Assistant Examiner*—E. E. Lehmann
*Attorney*—Karl F. Ross ABSTRACT: Method of making a hollow reinforced body comprising a plurality of helically wound generally flattened turns of a continuous thermoplastic band with each turn overlying a preceding turn by about one-half the width of the band and being overlapped by the next succeeding turn by about one-half the width of the band, the turns being bonded together under heat and pressure. The band includes a transversely stepped continuous metal reinforcing strip embedded therein and underlying the overlapping portion of the next succeeding turn and the strip thereof while overlying the strip of the next turn.

PATENTED NOV 2 1971 3,617,415

MANFRED HAWERKAMP
*INVENTOR.*

BY Karl G. Ross
*Attorney*

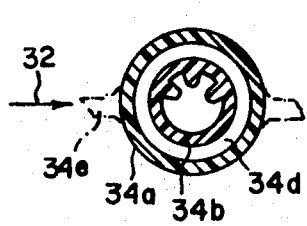
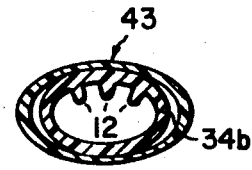
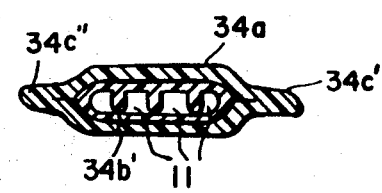
FIG. 9     FIG. 10     FIG. 11
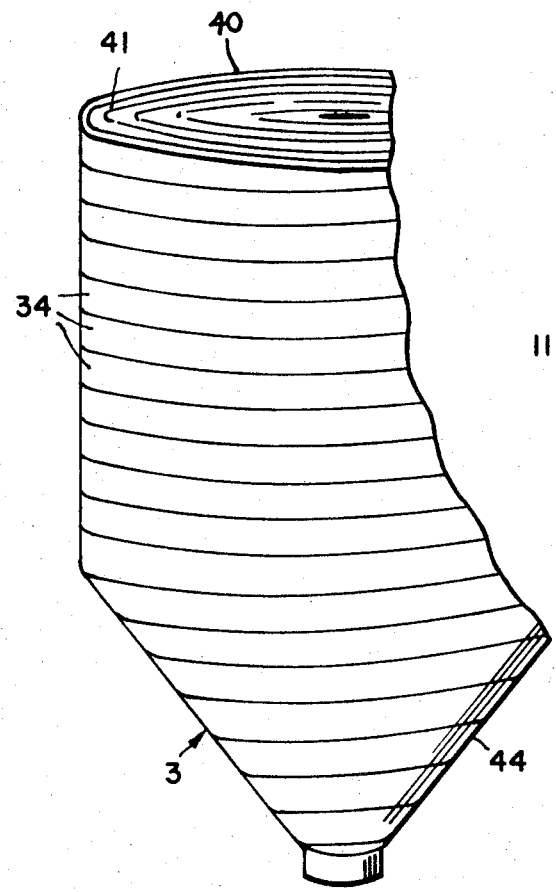
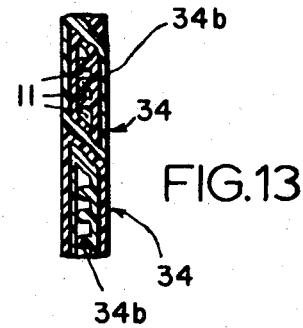
FIG. 12     FIG. 13
MANFRED HAWERKAMP
*INVENTOR.*
BY
*Karl J. Ross*
*Attorney*

METHOD OF MAKING HOLLOW REINFORCED BODIES

This application is a continuation-in-part of my application Ser. No. 516,945 filed 28 Dec. 1965 now abandoned.

My present invention relates to a method of making a hollow reinforced body (e.g., a tube, pipe, receptacle or tank) from a synthetic resin band.

In my copending application Ser. No. 516,839 (filed concurrently with the parent case), entitled "TUBULAR THERMOPLASTIC BODIES AND METHOD OF MAKING SAME," now U.S. Pat. No. 3,477,891 I describe a system whereby round hollow bodies can be produced from a synthetic resin band which is wound in a plastically deformable state about a mandrel or a core whereby the longitudinal edges of the band are joined together in successive turns to produce a body whose circumferential extent is greater than the width of the band. In this application, I point out that the winding of synthetic resin bands spirally or helicoidally about a core or mandrel can produce a hollow body having great strength when the turns envelop an elongated profiling formation carried by the core and are shaped correspondingly to this formation so as to produce a helicoidal, spiral or annular rib; the ribs like corrugations conventionally provided in pipes and similar articles, increase the strength of the member while permitting it to yield under stress where desired. The ribs are inwardly open and can retain the profiling formation when the latter is a member wound about the mandrel or core concurrently with or prior to the winding of the plastically deformable synthetic resin band thereon. In this case, the reinforcing element is thermally bonded to the rib and serves to increase the stiffness of the pipe or receptacle thus produced, the inner surface of this reinforcing element being continuous with the inner wall of the article and exposed to the interior thereof while completely filling this inwardly open rib.

It will be apparent that such an article can have a relatively large diameter even when the band itself is of a small width and can be produced substantially continuously by the winding or coiling process. In fact, this method constitutes a vast improvement over prior systems in which receptacles and pipes were built up with longitudinally extending seams in a time consuming and complex manner. While the helical or spiral winding of synthetic resin layers upon a core or mandrel has been proposed heretofore, it has been observed that the strength and stiffness of the walls produced by such winding have been lacking. Various problems were, however, encountered in earlier efforts to laminate such walls by winding a plurality of bands in layers successively outwardly upon the body and disposing between such layers reinforcing strips, bands or other elements of fabrics. A principal difficulty in the latter techniques arose from the fact that the inlays between the layers of synthetic resin could not be accurately set and held in position during the subsequent winding of the synthetic resin layer. Another disadvantage was that at least two separate winding steps were required to enclose the reinforcing inlay.

It is an important object of the present invention to provide an improved method of making a reinforced hollow body which can be manufactured relatively simply and inexpensively in a wide variety of shapes and sizes and which is characterized by great strength and relatively light weight.

This object and others which will be apparent hereinafter are attained, in accordance with my present invention, by a method of making hollow bodies by forming a generally tubular and preferably flattened band of a plastically deformable synthetic resin material, inserting into the interior or this band a pliant reinforcing element more firm than the plastically deformable material, and thereafter winding the band containing the continuous reinforcing element in successive turns about a mandrel or core while bonding the successive turns together to form a hollow body.

The reinforcing element is thus disposed within the band and held in place thereby without any need for an adhesive or other bonding of the reinforcing element to previously formed portions of the body or of the band portions subsequently implied. A reinforced body having a completely enclosed reinforcing element or inset can thus be produced with only a single winding operation and from a single helically or spirally wound band layer. No problems are encountered with shifting of the reinforcing element.

According to a more specific feature of this invention, the bottom and, if desired, top walls of a container or receptacle, which extend transversely of the receptacle axis, can be formed from a single band and winding produced continuously by an extrusion device together with axially extending walls of the receptacle. The body produced in this manner has strongly reinforced wall portions and is relatively inexpensive to manufacture and does not possess weak spots at the transitions between the wall and the bottom of the receptacle.

According to a further feature of this invention, the successive turns of the band, which are joined together to form the hollow body, are overlapped over a width less than that of the band and preferably not greater than half the band width. For this purpose, the band can be stepped along its longitudinal edges with the opposite edges being of complementary configuration so that the overlapped thickness of the layer formed by the windings will not exceed the height of the larger step.

Advantageously, the overlapped portions of the band are disposed laterally outwardly of the reinforcing element so that overlapping of the reinforcing element in successive turns is prevented. Thus the band can have a central portion provided with the reinforcing element and a pair of lateral portions adapted to be overlapped upon winding around the mandrel or core and disposed outwardly of this central portion.

Furthermore, the reinforcing element itself can be a profiled member when inserted into the respective band and is flattened upon winding about the core or mandrel.

The configuration of the profiled element is then selected in accordance with still another feature of this invention to provide longitudinal channels through the band and thus helical or spiral channels in the walls formed by the band. Such channels can serve to conduct a cooling or heating fluid in heat-exchanging relationship with the contents of the receptacle or tube, or may serve as a thermally insulating gas space when heat transfer through the walls of the vessel is to be limited. The use of a coolant permits the vessel to be employed for substances at a higher temperature than hitherto considered practical with thermoplastic containers. Furthermore, the presence of channels in the walls of the vessel ensures that the weight thereof will be relatively low.

The reinforcing elements suitable for use in accordance with the present invention include fiberglass fabric webs or bands, metal-wire fabric or screening, plastic-filament fabrics, films, foils especially polyamide and polyester fabric bands), and metal or synthetic resin profiles.

It will be understood, of course, that pliant elongated profiles adapted to be inserted into the band of the present invention can have a closed-wall configuration, like the bands themselves, so as to form internal ducts or may be of channel configuration so as to form ducts with those portions of the band walls in the direction of which the channel opens.

According to a further feature of this invention, the band containing the reinforcing element may have a thickness substantially equal to its width when it is to be coiled in a plane in spiral configuration to form a well of a vessel perpendicular to its axis but may have a width in excess of its thickness for longitudinally extending wall portions. Advantageously, the reinforcing element is here made flattenable so that in its normal position it retains the band in an unflattened condition for coiling in spiral form but is flattenable with the band for helicoidal coiling to form the longitudinal walls of a vessel.

Still another aspect of this invention involves the insertion of the reinforcing element within the plastically deformable tubular band.

The present invention provides that the continuous band to be formed by extrusion prior to its application or winding upon the mandrel or core without substantial rigidification and I have found it to be highly advantageous to feed the pliant but relatively firm reinforcing element through an opening in the extrusion nozzle corresponding to the cavity of the tubular band so that the reinforcing element is inserted as the band is produced.

A further feature of this method aspect of the present invention resides in the flattening of the band and the reinforcing element as it is applied to the mandrel or core with the aid of a pressure roller or the like. The band is then flattened to a lesser extent when a bottom of a container is being formed and to a greater extent as the longitudinal walls are wound. When frustoconical walls or other transition regions of the container are produced, the degree of flattening can be adjusted accordingly.

An important feature of this invention resides in the extrusion in a continuous strip of a closed-section profiled (tubular) plastically deformable synthetic resin band spacedly about a channel-shaped flattenable continuous insert; after the extrusion of the sheath and core in this fashion, the band is flattened (by one or more profiled rollers which may be the same as those forming the overlaps or applying the band to the mandrel) to simultaneously spread the core or insert and thus cause the cross section of the latter to coincide (be coextensive) with the interior cross section of the flattened band.

The above and other objects, features and advantages of this invention will become more readily apparent from the following description, reference being made to the accompanying drawing in which:

FIGS. 9 through 11 are similar views of the band shown in place in FIG. 4;

FIG. 12 is a perspective view of a reinforced-wall container according to this invention; and FIG. 13 is an enlarged detail view of the wall.

Figure 1:
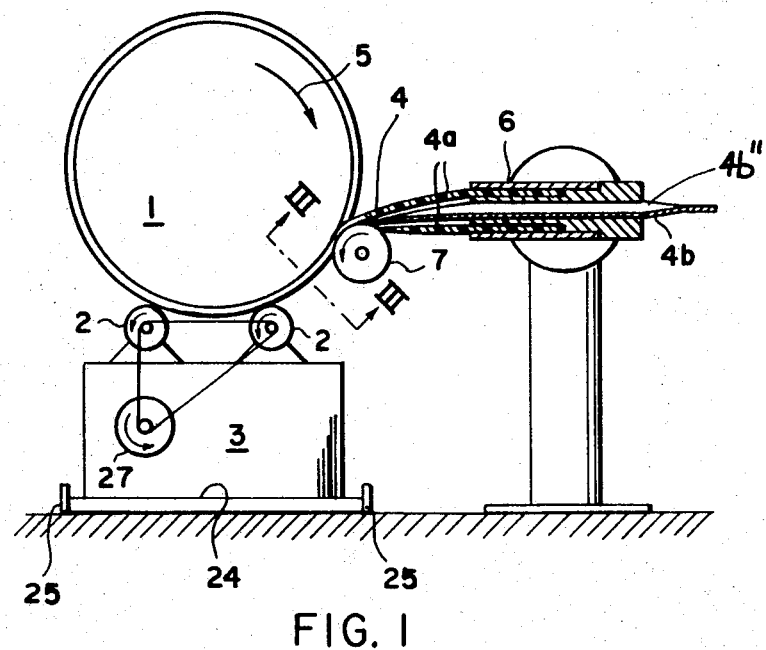
FIG. 1 is a side elevational view, partly in cross section, schematically illustrating an apparatus for forming a reinforced hollow cylindrical pipe or other body in accordance with my invention.
Figure 2:
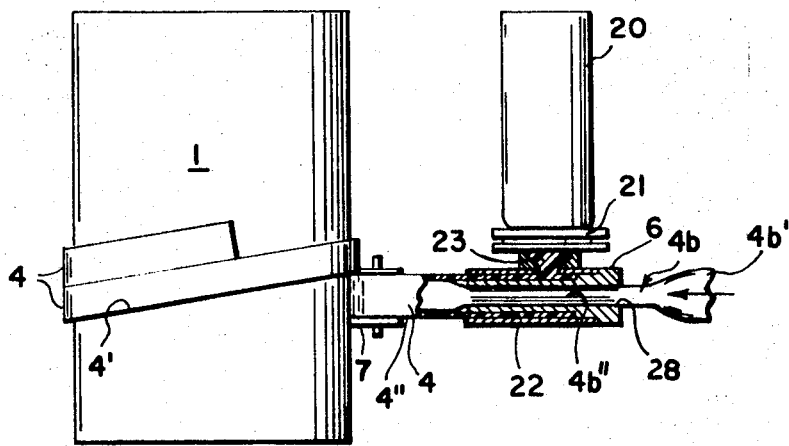
FIG. 2 is a plan view of the device of FIG. 1, partly broken away.

In FIGS. 1 and 2 of the drawing, I show the basic parts of an apparatus according to the invention for the manufacture of hollow bodies such as receptacles and tubes from a continuous thermoplastic band. The apparatus comprises an extrusion-molding device 20 of any conventional type whose outlet 21 communicates with an extrusion die or head 6 whose annular extrusion passage 22 forms a closed-wall band 4 which is ejected to the left in the direction of a winding mandrel or core1. The annular extrusion-molding passage 22 communicates with an inlet 23 which is supplied with a plasticized thermoplastic material (e.g., polyvinylchloride, polyethylene, polystyrene, or other thermoplastic synthetic resin as a homo- or copolymer), from the outlet of the extrusion press 20.

The mandrel 1 is rotatable in the clockwise sense (arrow 5) upon a pair of support rollers 2 on a pedestal 3 which is axially shiftable on a slide 24 guided between the rails 25 so as to permit movement of the mandrel 1 in the direction of arrow 26. The mandrel 1 is advanced in the direction of arrow 26 at the rate at which the tubular band 4 is wound upon the mandrel in terms of the number of turns per unit time multiplied by the nonoverlapped width of the band 4.

At least one of the support rollers 2 is driven by an electromotor 27 (FIG. 1) at a peripheral speed (equal to that of the mandrel) corresponding substantially to the extrusion rate of the press 6, 20 in terms of length of extruded band per unit time. The band 4 is then laid onto the mandrel 1 in successive turns in the plastically deformable state in which it is received from the extrusion die 6, without elongation.

Figure 5:
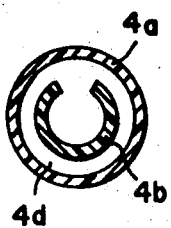
FIGS. 5 through 8 are transverse cross-sectional views through a band (e.g., that of FIGS. 1-3) adapted to be wound upon a core in accordance with the present invention showing different flattened conditions thereof.

A continuous reinforcing element 4b is fed through a central passage 28 of the extrusion die 6, this central passage constituting a bending die for the band 4b which, rearwardly of the die 6, is a flat strip 4b'. The band is bent within the passage into a profiled configuration (e.g., an open channel of cylindrical configuration as illustrated in FIG. 5) prior to being inserted into the tubular band 4 as it is extruded from the die 6. The channel-shaped section of the reinforcing strip 4b is designated at 4b''.

As the band 4, now containing the reinforcing element, is pressed against the mandrel 1 by a pressure roller 7, it is thermally bonded by its own heat content along the seam 4' to the previously formed turn and can be bonded along its other edge 4'' to the next turn as the winding upon the mandrel continues. The roller 7 flattens the tubular band as it is applied to the mandrel (FIG. 1).

Figure 6:
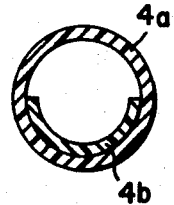
Figure 7:
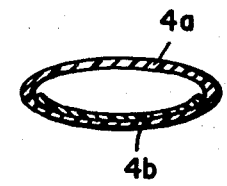
Figure 8:
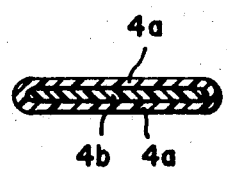

The flexible band 4 is of tubular configuration as illustrated at 4a in FIGS. 5-8 and may be flattened by the roller 7 from a circular cross section (FIG. 5) through an elliptical cross section (FIG. 7) to a flat section (FIG. 8).

It will be understood, however, that the flattening can be effected without the aid of the roller if the reinforcing element 4b is a resiliently bendable strip which is only temporarily deformed at 4b'' in the passage 28, as will be apparent from FIGS. 2 and 6-8, therefore the profiled portion 4b'' of the reinforcing strip will spring outwardly and tend to spread (FIG. 6) within the interior 4d of the tube 4a and thus flatten the latter in stages as indicated in FIGS. 6-8.

The roller 7 is provided with steps 8', 8'' of small and large diameter, respectively, and with a beveled flange 8a, the axial lengths of the smaller and larger diameter steps being slightly less than half the width of the band 4a in its flattened state. It will thus be apparent that the large diameter step 8'' forms a bed 9 of the band 4a against the mandrel 1 upon which an overlapped portion 10 of the next turn 4 of the band is disposed and is rolled onto the bed 9 by the small diameter portion 8'. Each band 4a is thus stepped and bonded in overlapping relationship to the low step of the previously laid turn.

A conical transition zone 8b between the steps 8' and 8'' form s a beveled interface 9a between the higher steps of the successive turns while the flange 8a forms the beveled seam 9b between the lower steps of the turn.

Figure 3:
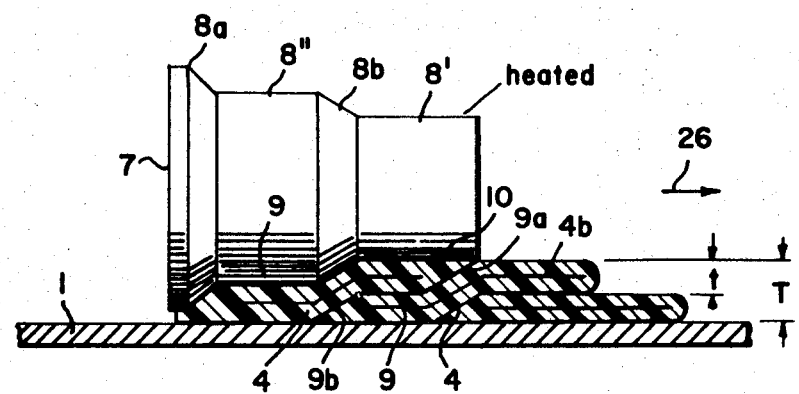
FIG. 3 is a detail view of along line III—III of FIG. 1 of the pressure roller for applying a thermoplastic band against the mandrel in accordance with one aspect of this invention.

From FIG. 3, it will be evident that the reinforcing band 4b is correspondingly stepped and overlapped so that the wall thickness T of the container or other hollow body formed on the mandrel is in excess of the thickness t of the reinforced band 4a coiled around this mandrel. The mandrel 1 is then shifted axially in the direction of arrow 26 by a distance equal substantially to the product of the number of turns and half the band width per unit time in terms of the rate at which the band is laid onto the mandrel 1. The steps each have a height corresponding substantially to the thickness t of the band.

The band is plastically deformable as it is extruded from the press 6, 20 and is not substantially cooled until after it is wound around the mandrel 1. Thus its residual heat is sufficient to effect bonding of the successive turns together. If additional heat is needed, the roller 7 can be electrically heated to ensure a satisfactory bond.

Figure 4:
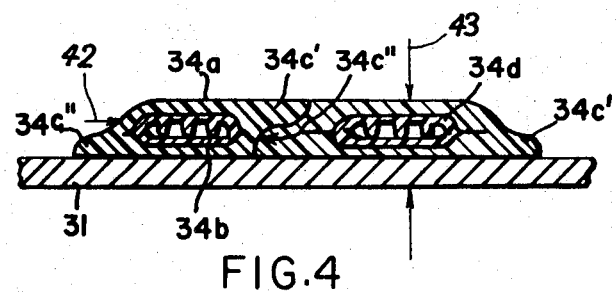
FIG. 4 is an axial cross-sectional view through a pair of successive turns of another hollow body being formed upon a mandrel.

It will be apparent, moreover, that a relatively thin band can be used in the overlapping arrangement of FIG. 3 with the desired wall thickness being established by the number of steps provided for band overlap. When, however, the reinforcing member is of increased thickness as indicated in FIG. 4, the thermoplastic band 34a can be provided laterally of the reinforced central zone with a pair of relatively thin steps 34c' and 34c'' extending along the opposite edges of the band outwardly of the reinforcement 34b. When the band is wound helically upon the mandrel 31, therefore, these step portions 34c' and 34c'' are overlapped by the width of these steps (FIG. 4) so that the thickness of the wall formed by the coiling of the band 34a is substantially equal to that of the larger step of the band.

When the band 34a is extruded with complementarily beveled steps on its opposite longitudinal edges, or such complementary bevels are provided during the rolling operation, an overlap seam is obtained whose thickness is equal to that of the larger step of the band.

As will be evident from FIGS. 9–11, the reinforcing element 34b is initially of cylindrical configuration and is received within the thermoplastic band 34a with clearance from the walls thereof as shown in 34d.

As is the case with the reinforcing element of FIGS. 5–8, element 34b can be of synthetic resin which is somewhat stiffer than the plastically deformable tubular band 34a at least until it is rolled onto the mandrel 31. During the rolling process, the longitudinally extending ribs 12 of the reinforcing element 34b rest against the opposite wall 34b' to define between them longitudinally extending channels 11 which run through the interior 34d of the tubular band 34a even when it is fully flattened. Thus, unlike the system illustrated in FIG. 8, when the band 34 is applied in a flattened condition to the mandrel, passages 11 remain to conduct a heating or cooling fluid through the wall 40 (FIG. 12) defined by the successive turns 34 of a container 3.

During the flattening process, the steps 34c', 34c'' are produced as indicated earlier. Here, therefore, the reinforcement 34b is disposed only in the central regions of the band 34a. As indicated at 34e (FIG. 9), the extrusion process can produce the overlappable steps 34e which remain after flattening of the tube. As indicated in FIG. 12, a container 3 can be provided with the longitudinally extending wall 40 overlapped in the manner illustrated in FIG. 4 and merging directly into a spiral transverse wall 41 in which the tube 34a can be compressed in the direction of arrow 42 rather than the direction of compression 43 used for the longitudinal walls. When the tube 34a is of polygonal cross section, however, it is merely necessary to refrain from compaction of the band during the coiling so that the successive turns are composed of a band whose width is substantially equal to its thickness. When the convergent bottom portion 44 is produced, the degree of compression can be produced so that the cross section of the band in this region may be elliptical as indicated in FIG. 10. Thus, the entire container 3 is formed from a single continuous winding which may have its turns also secured together by an adhesive if desired.

The invention described and illustrated is believed to admit of many modifications within the ability of persons skilled in the art, all such modifications being considered within the spirit and scope of the appended claims.

I claim:
1. A method of making a hollow body comprising the steps of:
   extruding a tubular thermoplastic band in a plastically deformable state;
   feeding a pliable reinforcing element of a firmness in excess of that of said band into the interior thereof upon its extrusion;
   winding said band in successive turns with said element therein continuously about a mandrel an bonding together the successive turns thus formed continuously to define a wall portion of a body, said reinforcing element being profiled upon insertion into said band;
   flattening said band prior to the bonding of said turns together; and
   providing in said element a longitudinally extending channel, said band being flattened without obstruction of said channel.

2. The method defined in claim 1 wherein said band is flattened by rolling it onto said mandrel.

3. The method defined in claim 1, further comprising the step of overlapping the successive turns alongside the reinforcing element thereof and bonding together the overlapped portions of said turns.

4. A method of making a hollow body comprising the steps of:
   extruding a tubular thermoplastic band in a plastically deformable state;
   feeding a pliable reinforcing element of a firmness in excess of that of said band into the interior thereof upon its extrusion;
   winding said band in successive turns with said element therein continuously about a mandrel and bonding together the successive turns thus formed continuously to define a wall portion of a body, said reinforcing element being profiled upon insertion into said band; and
   flattening said band prior to the bonding of said turns together, said reinforcing element being a channel and said band being extruded around said channel with clearance, said channel and said band being flattened such that the cross section of the flattened channel is coextensive with the interior cross section of said band upon the flattening thereof.

5. The method defined in claim 4 wherein said channel is longitudinally open and is spread apart upon flattening thereof.

6. The method defined in claim 4 wherein said channel is closed but bormed internally with at least one longitudinally extending rib adapted to bear upon an opposite side of the channel upon the flattening thereof to maintain a passage in said channel.

7. The method defined in claim 4 wherein said channel is composed of a synthetic resin, further comprising the step of bonding the channel to said band upon the flattening thereof.

8. The method defined in claim 4, further comprising the step of overlapping the successive turns alongside the reinforcing element thereof and bonding together the overlapped portions of said turns.

* * * * *